United States Patent [19]

Abe et al.

[11] 4,035,772
[45] July 12, 1977

[54] UTILITY METER READING SYSTEM

[75] Inventors: Takeshi Abe; Keishin Tsuchiya, both of Tokyo, Japan

[73] Assignee: Ricoh Co., Ltd., Tokyo, Japan

[21] Appl. No.: 618,973

[22] Filed: Oct. 2, 1975

[30] Foreign Application Priority Data

Oct. 3, 1974  Japan .............................. 49-114010

[51] Int. Cl.² ........................................ H04Q 11/00
[52] U.S. Cl. ............................... 340/151; 340/150; 340/163
[58] Field of Search .......... 340/151, 183, 204, 203, 340/150, 163

[56] References Cited

U.S. PATENT DOCUMENTS

| 3,786,423 | 1/1974 | Martell | 340/151 |
| 3,868,640 | 5/1972 | Binnie | 340/151 |

*Primary Examiner*—Harold I. Pitts
*Attorney, Agent, or Firm*—Frank J. Jordan

[57] ABSTRACT

A number of remote terminals are connected to various utility meters to store the readings therein. A central terminal sequentially transmits signals to the remote terminals to actuate the same to transmit the meter readings to the central terminal. Each remote terminal comprises storage units to store the readings of the meters respectively. Each storage unit is designed to store the number of digits required for the meter reading, and also a code digit which indicates the type of meter (gas, electric, etc.) or instructions (skip to next meter, remote terminal address, user number, etc.). The code digit is transmitted as if it were a part of the meter reading. A connector card is insertable into a receptacle to detachably set the codes into the storage units of the remote terminals.

5 Claims, 7 Drawing Figures

| 5TH DIGIT | 4TH DIGIT | CODE |
|---|---|---|
| 1 | — | GAS |
| 2 | — | WATER |
| 3 | — | ELECTRICITY |
| 4 | — | HOT WATER |
| 5 | — | CALORY |
| 6 | — | SPACE NO. |
| 7 | — | DATE |
| 8 | — | BLOCK NO. |
| 9 | — | USER NO. |
| 0 | 0 | TERMINAL ADDRESS |
| 0 | 1 | PASS |
| 0 | 2 | END-OF-TERMINAL |
| 0 | 3 | END-OF-METER |
| 0 | 4 | SPECIAL SERVICE |
| 0 | 5 | SECURITY |

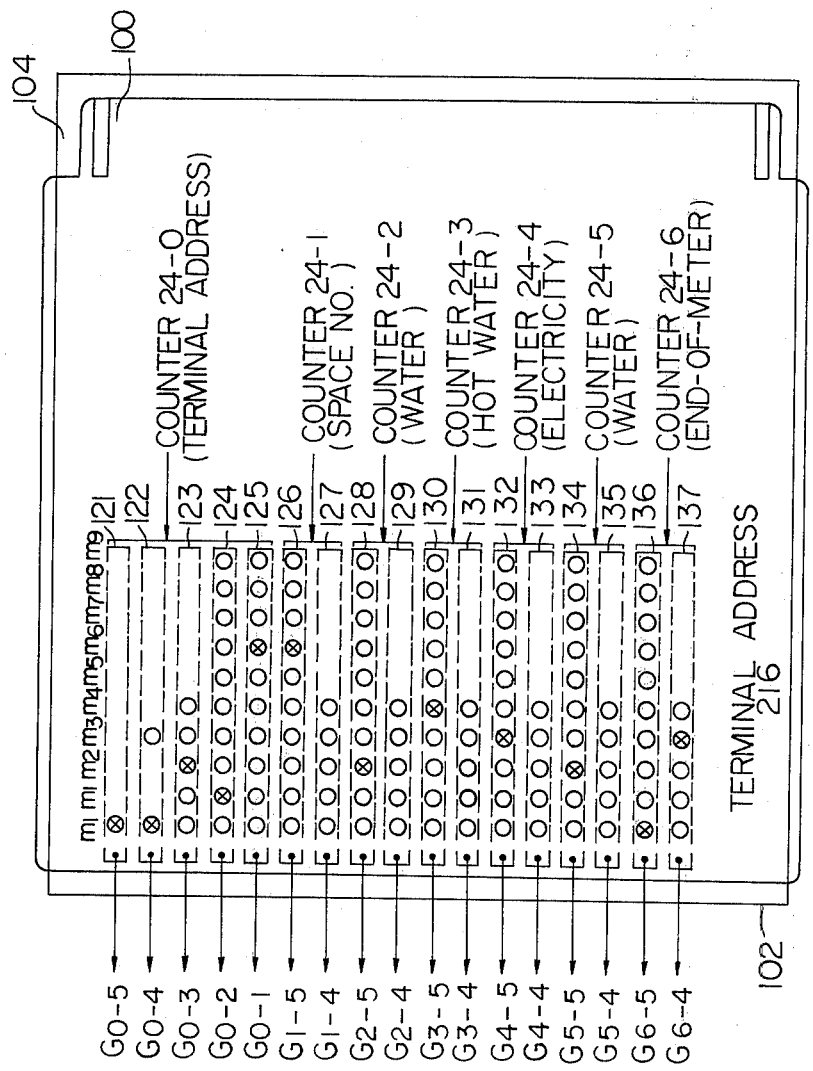

UTILITY METER READING SYSTEM

BACKGROUND OF THE INVENTION

The present invention relates to a remote control utility meter reading system.

In a utility meter reading system to which the present invention is an improvement, remote terminals are connected to various utility meters such as gas, electric meters and the like. A central terminal interrogates the remote terminals periodically over a telephone or leased line to read the meters. The system is especially advantageous in large apartment buildings and other areas in which there is a large concentration of utility meters.

It is desirable to have a single remote terminal connected to not just one type of utility meter but several types. For example, a single remote terminal may be connected to receive the readings of gas, electric and water meters in an apartment building. The problem arises, however, of how the central terminal is to distinguish between the readings of the different meters. It is also necessary to provide user identification codes and the like to enable proper accounting.

In prior art systems of this type, the remote terminals are provided with counters to count the number of units of the particular utility used and also with a code generating apparatus to generate a code indicating the address of the remote terminal, user identification numbers, the type of utility represented by each counter and the like. These prior art systems suffer from the drawback, however, that the code generating apparatus is expensive to manufacture and must be replaced along with the counters when there is a change in the user or utility.

It is therefore an important object of the present invention to provide a utility meter reading system comprising remote terminals which can be used to measure the use of any utility.

It is another object of the present invention to provide a utility meter reading system in which remote terminals do not require code generating apparatus.

It is another object of the present invention to provide a utility meter reading system in which digits of counters which are not used to represent meter readings are used to represent codes.

The above and other objects, features and advantages of the present invention will become clear from the following detailed description taken with the accompanying drawings.

BRIEF DESCRIPTION OF THE DRAWINGS

FIGS. 4a and 4b show a connector card and respective halves of a receptacle for the connector card;

DESCRIPTION OF THE PREFERRED EMBODIMENTS

Figures 1, 3:
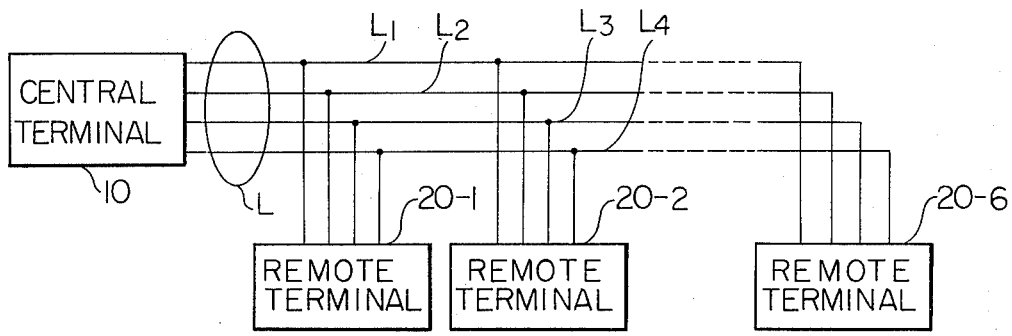
FIG. 1 is a block diagram of a utility meter reading system embodying the present invention.
FIG. 3 is a chart illustrating code digits used in the system.

Referring now to FIG. 1, a utility meter reading system embodying the present invention comprises a central terminal 10 which is connected to six remote terminals 20-1 to 20-6 by a leased line L which constitutes a communication link. The remote terminals 20-1 to 20-6 are essentially identical, and the remote terminals 20-3 to 20-5 are not shown for simplicity of illustration. The line L comprises a terminal address line L1, a counter selection line L2, a digit selection line L3 and a date line L4.

Figure 2:
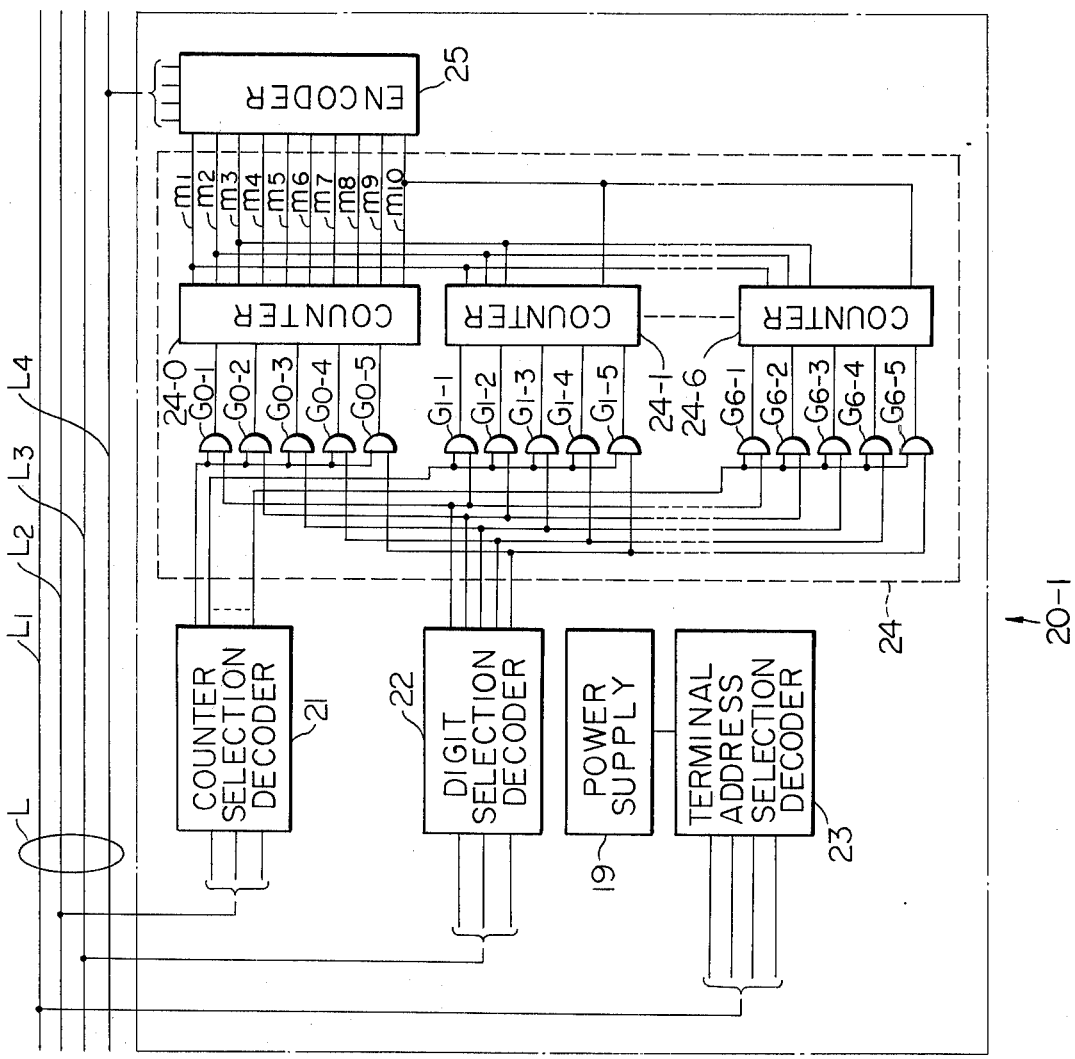
FIG. 2 is a schematic diagram of a remote terminal constituting part of the system shown in FIG. 1.

Referring now to FIG. 2, which shows the remote terminal 20-1, the terminal address line L1 is connected to a terminal address selection decoder 23. The counter selection line L2 is connected to a counter selection decoder 21 and the digit selection line L3 is connected to a digit selection decoder 22.

A counter group 24 comprises seven counters 24-0 to 24-6, only the counters 24-0, 24-1 and 24-6 being shown for simplicity of illustration. The counters 24-0 to 24-6 are digital and are connected to count the units of various utilities which are used by means of sensors which are not shown. The counters 24-0 to 24-6 each have 10 outputs representing the digits 0 to 9 which are connected in parallel to lines $m0$ to $m9$ respectively. The lines $m0$ to $m9$ are connected to an encoder 25 which converts the digital signals on the lines $m0$ to $m9$ into binary form for transmission over the date line L4.

Each of the counters 24-0 to 24-6 is connected to store the reading of a single utility installation such as a gas meter for a single dwelling. Each counter 24-0 to 24-6 has five digit positions or storage elements which are not specifically illustrated. Only four digits are usually required to store a utility reading in general practice since the reading is usually less than 9999. The fifth digit is used as a code digit in accordance with the present invention.

The counter 24-0 has five enable inputs and operates in such a manner that when one of the enable inputs is energized the contents of the respective digit position or storage element appear as a signal on one of the lines $m0$ to $m9$. For example, if the contents of an exemplary digit position or storage element is the digit 6, a signal will appear on the line $m6$. AND gates G0-1 to G0-5 have outputs connected to the enable inputs of the respective digit position or storage elements of the counter 24-0. AND gates G1-1 to G1-5 are provided for the counter 24-1 in an identical manner, as well as AND gates G6-1 to G6-5 for the counter 24-6. AND gates G2-1 to G2-5 to G5-1 to G5-5 are provided for the counters 24-2 to 24-5 although they are not shown.

The counter selection decoder 21 has seven outputs which are sequentially energized as will be described below. The first output is connected to inputs of all of the AND gates G0-1 to G0-5. The second to seventh outputs of the counter selection decoder 21 are connected to inputs of the AND gates G1-1 to G6-6 in the same manner. The digit selection decoder 22 has five outputs which are connected to inputs of the AND gates G0-1 to G0-5 respectively. The five outputs of the digit selection decoder 22 are connected to the AND gates G1-1 to G6-6 in an identical manner. It will be seen that only one AND gate G0-1 to G6-6 and thereby only one enable input of the counters 24-0 to 24-6 of the counter group 24 will be enabled at any time depending on which of the outputs of the decoders 21 and 22 are energized.

The output of the terminal address decoder is connected to a power supply 19 of the remote terminal 20-1.

Referring now to FIG. 3, in accordance with a novel feature of the present invention the 50 digits of the meter readings, and sometimes the fourth digits are used as code digits. When the fifth digit is 1 it indicates that the respective counter 24-0 to 24-6 is used to store a gas meter reading: and that the fourth to first digits represent a gas meter reading. When the fifth digit is 2 to 5, it indicates water, electricity, hot water and heat (calories or BTU's) respectively. When the fifth digit is 6, it indicates that the fourth to first digits represent a space number such as the number of a floor of an apartment building. The digit 7 indicates that the counter stores the date of the meter reading. The digit 8 similarly indicates a block number such as the number of a block in a city. The digit 9 indicates a user or customer identification number.

Figure 4B:
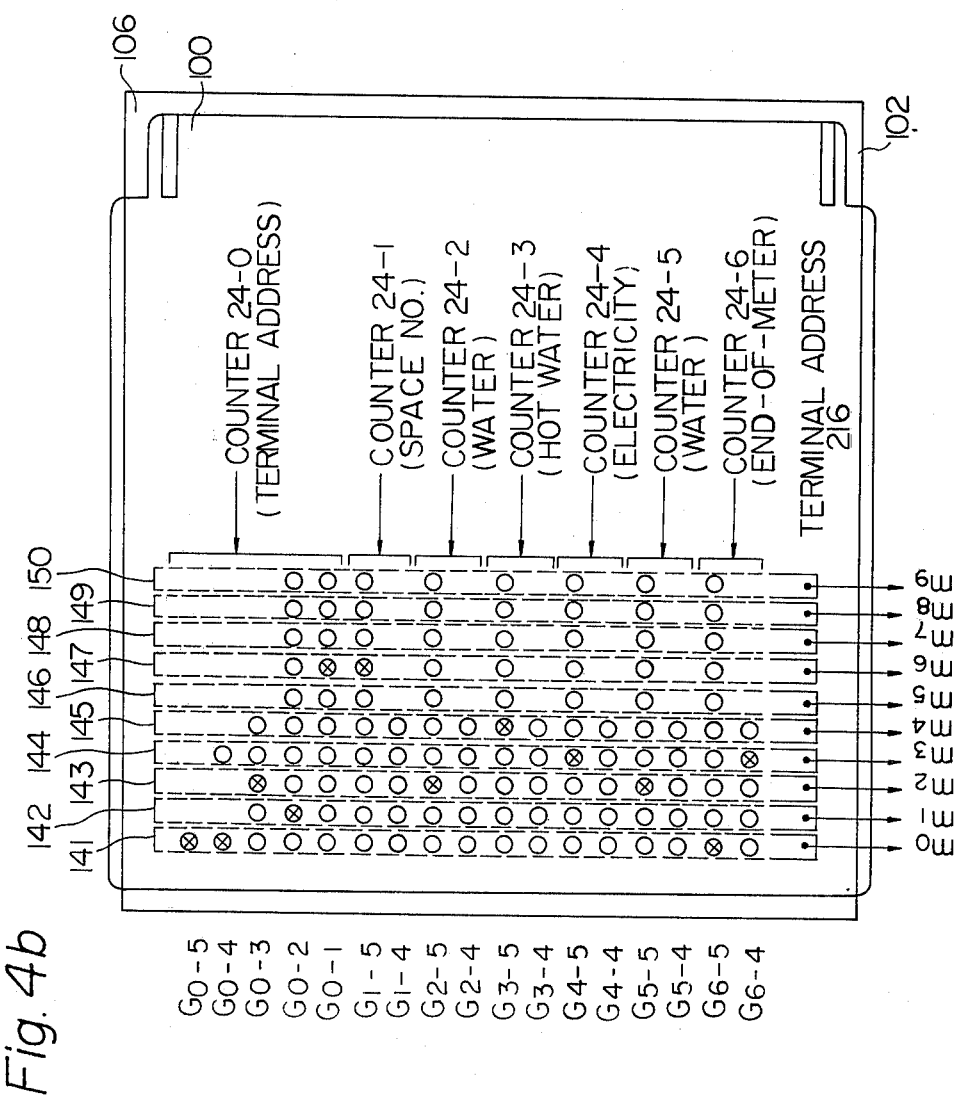
Figure 6:
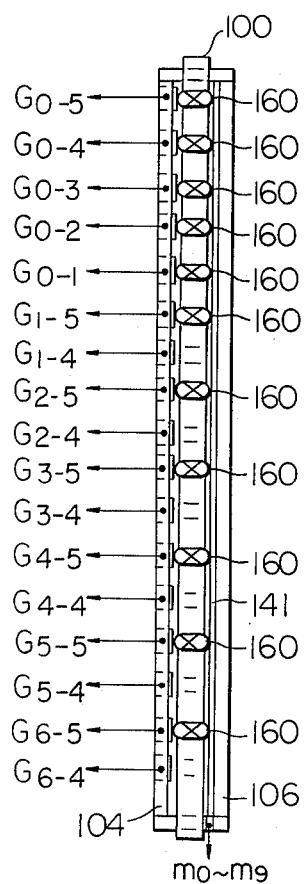
FIG. 6 is a cross sectional view of the connector card and receptacle.

When the fifth digit is 0, additional data can be indicated by using the fourth digit. When the fourth digit is 0 to 5, it indicates the address of the remote terminal (or terminal identification number), a pass or skip instruction, and end-of-terminal instruction indicating that the remote terminal is the last of a series of remote terminals, an end-of-meter instruction indicating that the counter is the last of the counter group, a special service instruction indicating that special utility rates should be applied to the reading and a security instruction. Referring now to FIGS. 4a 4b and 6, the system comprises a card 100 for reversibly detachably setting the codes into the remote terminals. The card 100 is insertable into a receptacle 102 which has two halves 104 and 106 which fit together to hold the card 100 therebetween. The half 104 comprises 17 horizontal parallel elongated conductors 121 to 137 which serve as input terminals and are connected to the outputs of the AND gates G0-1 to G6-5 as indicated in FIG. 4a. The half 106 of the receptacle 102 comprises 10 elongated vertical conductors 141 to 150 which serve as output terminals and are connected to the lines m0 to m9 respectively as shown is FIG. 4b. As best seen in FIG. 6, the card 100 is formed of an electrically insulating material and is provided with conductors 160 which extend through the card 100 to connect desired conductors 121 to 137 to desired conductors 141 to 150. The conductors 160 may be rivets, solder or the like and are designated in FIGS. 4a and 4b by circles enclosing crosses.

Figure 5:
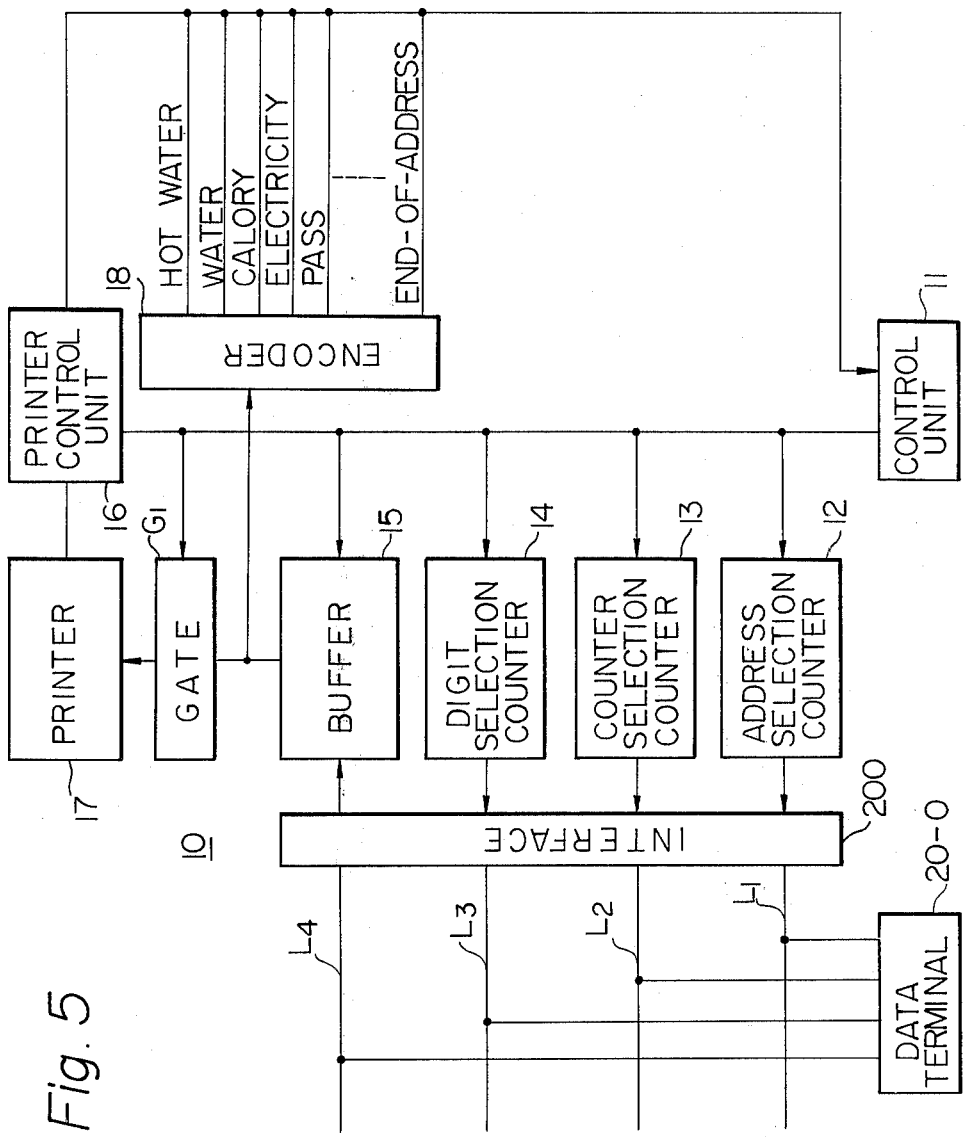
FIG. 5 is a block diagram of a central terminal constituting part of the system.

Referring now to FIG. 5, the central terminal 10 comprises as interface 200 to which the lines L1 to L4 are connected. A date terminal 20-0 is also connected to the lines L1 to L4 and serves to store information such as the data of meter reading and the like which is manually set in. The terminal 20-0 is not connected to utility meters and is part of the central terminal. The data terminal 20-0 is useful since it can be automatically read along with the utility meters.

A control unit 11 is arranged to control an address selection counter 12, a counter selection counter 13 and a digit selection counter 14 which have outputs connected to the lines L1 to L3 respectively through the interface 200. The line L4 is connected to a buffer 15 through the interface 200, which is also controlled by the control unit 11. The output of the buffer 15 is connected through a gate G1 to a printer 17, and also to an encoder 18.

The encoder 18 has outputs corresponding to the various codes as shown which are connected to the control unit 11 and also to a printer control unit 16 which controls the printer 17. The gate G1 and the printer control unit 16 are controlled by the control unit 11.

The operation of the system will now be described with reference to the drawings.

The address selection counter 12 is arranged to generate terminal address selection signals to sequentially activate the remote terminals 20-0 to 20-6 in sequence. The terminal address selection decoder 23 of each remote terminal 20-0 to 20-6 is operative to energize the power supply 19 of the respective remote terminal 20-0 to 20-6 only in response to the terminal address selection signal for the respective remote terminal 20-0 to 20-6.

Since the operation of all of the remote terminals 20-0 to 20-6 is identical, only the operation of the remote termianl 20-1 shown in FIG. 2 will be described.

The central terminal 10 transmits through the line L1 the terminal address signal for the remote terminal 20-1 which energizes the power supply 19 of the terminal 20-1 as long as the terminal address signal is present on the line L1. The counter selection counter 13 then feeds through the line L2 a counter selection signal to enable the AND gates G0-1 to G0-5 for the counter 24-0 of the remote terminal 20-1. The digit selection counter 14 feeds through the line L3 a digit selection signal which is decoded by the digit position decoder 22 of the remote terminal 20-1 and gated through the AND gate G0-5. Referring specifically to FIGS. 4a and 4b, it will be seen that conductor 160 connect the conductor 121 to the conductor 141 and thereby the output of the AND gate G0-5 to the line m0. the output of the AND gate G0-5 thereby appears on the line m0.

The signal on the line m0 is encoded by the encoder 25 and fed to the central terminal 10 through the line L4. The signal is stored in the buffer 15 and applied therefrom to the control unit 11. The control unit 11 recognizes that the signal represents a code digit 0 in the fifth digit position of the counter 24-0 and does not activate the printer control unit 16. The digit selection counter 14 is then incremented by the control unit 11 and feeds a signal through the line L3 to enable the AND gate G0-4. Since the conductor 122 is connected to the conductor 141 through conductor 160, the signal output of the AND gate G0-4 is fed to the line m0, encoded by the encoder 25 and fed to the buffer 15 of the central terminal 10. From the buffer 15, the signal is fed to the control unit 11 which recognizes it as a 0 digit in the fourth digit position and that the code 0 and 0 represents a terminal address as shown in FIG. 3. The control unit 11 then controls the printer control unit 16 to control the printer 17 to print "terminal address".

The control unit 11 then increments the digit selection counter 14 to apply a signal over the line L3 to enable the AND gate G0-3 through the digit selection decoder 22. Since the conductor 123 is connected to the conductor 143 by conductor 160, the output of the AND gate G0-3 is applied to the line m2 and fed to the buffer 15 of the control unit 11. The control unit 11 recognizes this signal as representing the digit 2 in the third digit position of the counter 24-0 which is the first digit of the terminal address and controls the printer control unit 14 to control the printer 17 to print 2. This procedure is continued so that the lines m1 and m6 are energized to cause the printer 17 to print out a 1 and a 6 which are the following digits of the terminal address which is 216.

It will be noted that the counter 24-0 is actually redundant in that al of the digits are hard-wired into the system by means of the card 100. The counter 24-0 may thereby be omitted if desired.

Subsequently, the control unit 11 controls the counter selection counter 13 to be incremented and apply a signal through the line L2 to enable the AND gates G1-1 to G1-5 for the counter 24-1. The control unit 11 further controls the digit selection counter 14 to be reset and apply a signal through the line L3 to enable the AND gate G1-5. Since the conductor 126 is connected to the conductor 147 through conductor 160, the output signal of the AND gate G1-5 is fed to the line m6, encoded by the encoder 25 and stored in the buffer of the central terminal 10. The control unit 11 recognizes the signal as a digit 6 in the fifth digit position of the counter 24-1 which represents a space number. The control unit 11 thereby causes the printer 17 by means of the encoder 18 to print "space number". The control unit 11 then increments the digit selection counter 14 to enable the AND gate G1-4. The output of the AND gate G1-4 enables the enable input of the fourth digit position of the counter 24-1 so that the digit stored in the fourth digit position appears as a signal on one of the lines m0 to m9. This signal is fed to the buffer 15 of the central terminal 10. The control unit 11 then enables the gate G1 to feed the digit to the printer 17 and controls the printer 17 to print the digit. This procedure is repeated for the remaining digits of the space number.

The counters 24-2 to 24-6 are then sequentially actuated in the same manner to transmit the codes and meter readings to the central terminal 10.

The fifth and fourth digit codes of the counter 24-2 are 2 and blank as shown in FIGS. 4a and 4b. The counter 24-2 is thereby used for storing a water meter reading. The code for the counter 24-3 is 4 and blank, and the counter 24-3 is used for hot water. The counter 24-4 has the codes 3 and blank, and is used for electricity. The counter 24-5 has the codes 2 and blank, and is also used for water. The counter 24-6 has the codes 0 and 3, and signifies that the counter 24-6 is the last in the remote terminal 20-1. The counter 24-6 may also be omitted if desired.

Many modifications to the system shown and described will become apparent to those skilled in the art after receiving the teachings of the present disclosure. For example, the card 100 and receptacle 102 may be replaced by means such as a switch group to set the codes into the system. The fifth digit positions of the counters may also be omitted since they are provided in hard-wired form by the card 100. It will be further understood that the present invention is not restricted to a utility meter reading application but may be applied to any application in which a data storage elements must be read by remote control.

What is claimed is:

1. A utility meter reading system comprising:

a remote terminal having a plurality of storage means respectively connected to utility meters and adapted to store meter readings of the utility meters therein, each of the storage means respectively having a predetermined number of meter reading storage elements for storing the meter readings and a code storage element for storing a code;

a central terminal;

communication link means connecting the central terminal to the remote terminal;

the central terminal being operative to transmit storage means selection signals to sequentially energize the storage means and storage element selection signals to sequentially actuate the storage elements of an energized storage means, whereby the central terminal is operative to sequentially actuate the meter reading and code storage elements of the remote terminal to transmit the meter readings and the code to the central terminal;

decoder means adapted to receive the storage means and storage element selection signals, the decoder means having outputs connected to enable inputs of the storage elements of the storage means; and code setting means for reversibly setting the codes into the code storage elements of the storage means, said code setting means comprising a receptacle having terminals connected to the code storage elements and a connection member detachably insertable into the receptacle, the connection member being adapted to connect desired terminals of the receptacle together and thereby set the codes into the code storage elements.

2. The utility meter reading system of claim 1, in which the receptacle comprises input terminals connected to outputs of the decoder means and output terminals connected to outputs of the storage elements of the storage means.

3. The utility meter reading system of claim 2, in which the input terminals of the receptacle are constituted by first elongated parallel conductors and the output terminals of the receptacle are constituted by second elongated parallel conductors, the first elongated parallel conductors being arranged perpendicular to the second elongated parallel conductors, the connection member being constituted by a card formed of an electrical insulating material with electrically conducting members extending therethrough to connect desired input terminals to desired output terminals.

4. The utility meter reading system of claim 1, further comprising a data terminal having a plurality of storage means and code setting means identical to the storage means and code setting means of the remote terminal, all of the storage elements of the data terminal being adapted to store data required in the utility meter reading system, the central terminal being operative to sequentially actuate the storage elements of the data terminal in an identical manner as the storage elements of the remote terminal.

5. The utility meter reading system of claim 4, in which the central terminal comprises a printer to print out data in the data terminal and the meter readings in the remote terminal.

* * * * *